(12) United States Patent
Lautenschlager

(10) Patent No.: US 6,455,317 B1
(45) Date of Patent: Sep. 24, 2002

(54) METHOD OF CONTROLLING A CHEMICAL PROCESS BY MICROWAVE RADIATION

(75) Inventor: Werner Lautenschlager, Leutkirch (DE)

(73) Assignee: Milestone s.r.L., Sorisole (BG) (IT)

( * ) Notice: Subject to any disclaimer, the term of this patent is extended or adjusted under 35 U.S.C. 154(b) by 0 days.

(21) Appl. No.: 09/519,594

(22) Filed: Mar. 6, 2000

Related U.S. Application Data

(63) Continuation-in-part of application No. 08/969,292, filed on Nov. 13, 1997, now Pat. No. 6,033,912.

(51) Int. Cl.⁷ .............................................. G01N 33/20
(52) U.S. Cl. .................... 436/55; 219/679; 219/716; 422/78; 422/80; 422/108; 422/109; 422/117; 436/55; 436/62; 436/73; 436/74; 436/79; 436/80; 436/81; 436/82; 436/83; 436/84; 436/103; 436/106; 436/114; 436/115; 436/155; 436/157; 436/175
(58) Field of Search .................. 422/78, 80, 90, 422/105, 107, 108, 109, 117; 219/679, 716; 436/55, 62, 73–84, 103, 106, 114–115, 155, 157, 174–175, 182

(56) References Cited

U.S. PATENT DOCUMENTS

| | | |
|---|---|---|
| 4,484,065 A | 11/1984 | Ueda |
| 4,566,804 A | 1/1986 | Collins et al. |
| 5,174,864 A | 12/1992 | Arbizzani et al. |
| 5,382,414 A * | 1/1995 | Lautenschlager ........... 422/186 |
| 5,420,039 A | 5/1995 | Renoe et al. |
| 5,443,795 A | 8/1995 | Revesz |
| 5,447,077 A * | 9/1995 | Lautenschlager ........ 73/863.11 |
| 5,620,659 A | 4/1997 | Revesz |
| 5,840,583 A | 11/1998 | Barclay et al. |
| 6,000,935 A * | 12/1999 | Regimand et al. ............. 432/72 |
| 6,033,912 A * | 3/2000 | Lautenschlager ............. 436/55 |

FOREIGN PATENT DOCUMENTS

| | | |
|---|---|---|
| EP | 0 628 332 A1 | 12/1994 |
| EP | 0 701 387 A2 | 3/1996 |

OTHER PUBLICATIONS

H.M. Kingston, et al., "Microwave Energy for Acid Decomposition at Elevated Temperatures and Pressures Using Biological and Botanical Samples", Analytical Chemistry, vol. 58, No. 12, Oct. 1986, pp. 2534–2541.

C.B. Rhoads Jr., "Clean Laboratory Chemistry for the Microwave–assisted Digestion of Botanical Samples", Journal of Analytical Atomic Spectrometry, vol. 11, Sep. 1996, pp. 751–757.

D.W. Mincey et al., "Temperature Controlled Microwave Oven Digestion System", Analytica Chimica Acta, 264 (1992), pp. 97–100.

* cited by examiner

Primary Examiner—Arlen Soderquist
(74) Attorney, Agent, or Firm—Lacasse & Associates, LLC

(57) ABSTRACT

A system and method for controlling a microwave heated chemical process is disclosed. Time varying concentrations of some chemical substances within fumes in the microwave oven are monitored to detect concentration variations for which responses are known. Responses to the detected variations are initiated to control the chemical process without terminating the process. Examples of responses include varying microwave radiation energy, initiating safety systems, increased venting of the microwave oven, and so forth.

20 Claims, 8 Drawing Sheets

METHOD OF CONTROLLING A CHEMICAL PROCESS BY MICROWAVE RADIATION

This is a continuation-in-part 08/969,292 filed Nov. 13, 1997 of U.S. Pat. No. 6,033,912 issued Mar. 7, 2000.

FIELD OF THE INVENTION

This invention relates generally to the use of microwave radiation in chemical processes, and more particularly, to a method of controlling microwave assisted chemical reactions or solvent extraction processes.

BACKGROUND OF THE INVENTION

Digestions of materials in digesting liquids, such as strong acids, have been conducted in digesting systems wherein the digesting liquid was heated by microwave radiation. See, for example, European patent 0,416,759, European published specification 0,455,513 and U.S. Pat. No. 5,215,715. Extractions with solvents, wherein the solvent is sufficiently polar to absorb microwave radiation and convert it to heat, have also been employed as reported in Volume 371 of the Journal of Chromatography, at pages 299–306. A mixture of polar and non-polar solvents can be utilized, with the polar solvent absorbing microwave radiation and causing heating of the mixture.

Although digesting acids are corrosive, they are not usually explosive; however, many organic solvents are explosive when their vapors are mixed in a certain ratio with air. Thus, a safety problem can be encountered when conducting microwave heated extractions unless potential explosions are recognized and procedures are followed to prevent any such explosion. In U.S. Pat. No. 5,620,659 issued Apr. 15, 1997 in the name of Revesz, a system for preventing explosive incidents is disclosed. The system operates by detecting the presence of very small quantities of solvent vapors in exhaust air from a microwave chamber. When the solvent vapor concentration increases approaching explosive proportion, the source of microwave radiation, which otherwise could cause ignition of an explosive mixture of solvent vapor and air in the microwave chamber, is shut down. Alternatively, the entire electrical system of the digesting apparatus is shut down in response to such detection. To be safe, such shutdowns occur when the content of solvent vapor in air is less than the lowest explosive limit. Thus, according to the teachings of Revesz, early detection of any leak in the system or of any rupture of a safety diaphragm on the extracting vessel is essential. The purpose of the rupture diaphragm is to prevent explosive failure of the extracting vessel due to excess pressure that might be developed within the vessel while the extracting solvent is heated.

European patent specification 0,455,513, the disclosure of which is hereby incorporated by reference, discloses such a rupture diaphragm in a digesting system. Further, U.S. Pat. No. 5,620,659 teaches the presence of a collecting container for collecting any vented vapor and liquid from a digesting container that has blown its rupture diaphragm. Though the system taught by Revesz is useful in preventing explosions, such a system is not useful in controlling an extraction process. From the teachings of Revesz, it is clear that once failure of an extracting vessel has occurred, monitoring for explosive chemicals is necessary. Commonly, when using microwave radiation for extraction, a plurality of vessels is placed within a microwave oven for simultaneous extraction. When a rupture diaphragm on a single vessel ruptures, the escaping solvent vapors may result in shutting down the system. Unfortunately, such a result affects all vessels and samples within the device. As such, it is not a desirable outcome. Further, when an extraction process is progressing, the rupturing of a rupture diaphragm results in an open topped vessel where a closed top vessel was desired. This open top often renders a resulting extraction unsuitable for analysis due to uncontrolled loss of vessel contents. Therefore, though a catastrophic failure such as an explosion is averted, it is only at the cost of the reactions in progress.

In U.S. Pat. No. 5,382,414 issued on Jan. 17, 1995 in the name of Lautenschlager and herein incorporated by reference, a resealable venting vessel cover is disclosed. Such a vessel cover obviates a need for a rupture disc by releasing gas from a vessel when pressure within the vessel is excessive and resealing the vessel when the pressure within the vessel is again below the threshold pressure. The released gas may accumulate in a collection chamber when present or in the microwave chamber itself when no collection chamber is used. The gas is vented through a venting system. The use of the resealable venting vessel cover, allows for continued extraction, digestion or hydrolysis of the sample contained within the vessel with only nominal loss of vessel contents.

In U.S. Pat. No. 5,447,077 issued Sep. 5, 1995 to Lautenschlager, which is hereby incorporated by reference, a device for microwave radiation heated evaporation is disclosed. Such a device employs vessels with outlets therein through which evaporated chemicals are discharged and an inlet through which air or other gases are fed into the vessels. It would be advantageous to provide a system for controlling a process heated by microwave radiation such as extraction, digestion or hydrolysis in order to improve the results of the process. It would also be advantageous to control a process heated by microwave radiation in order to avert explosive situations or potentially explosive situations without stopping the process.

SUMMARY OF THE INVENTION

An object of the present invention is to provide a method of controlling microwave heated chemical processes based on information obtained through a chemical sensor strategically placed within the microwave system. In particular, the chemical sensor detects one or more gases that are present in the microwave system, and preferably gases that have diffused through the sample vessel or through some component of the sample vessel. Monitoring gases that have diffused through the sample vessel or through some component of the sample vessel, is ideal because it provides insight into the process occurring within the vessel.

In accordance with the invention there is provided a method of controlling a microwave heated chemical process. The method comprises the steps of: irradiating a gas permeable sample vessel which contains one or more chemical substances; producing one or more gases within the gas permeable vessel from the chemical substances; monitoring the gases diffused from the gas permeable sample vessel with a chemical sensor to obtain chemical information about the diffused gases; analyzing the chemical information received from the chemical sensor to determine data indicative of the diffused gases; and modifying an aspect of the chemical process in response to the determined data indicative of the diffused gases.

In accordance with another embodiment of the invention there is provided a method of controlling a microwave heated chemical process. The method comprises the steps of: irradiating a gas permeable sample vessel which contains one or more chemical substances; producing one or more gases within the gas permeable vessel from the chemical substances; detecting the gases diffused from the gas permeable sample vessel with a chemical sensor to obtain chemical information about the diffused gases; analyzing the chemical information received from the chemical sensor to determine data indicative of the diffused gases; and applying an external stimulus to the chemical process in response to the determined data indicative of the diffused gases.

In accordance with another embodiment of the invention there is provided a method of controlling a microwave heated chemical process. The method comprises the steps of: irradiating a gas permeable sample vessel which contains one or more chemical substances; producing one or more gases within the gas permeable vessel from the chemical substances; sensing the gases diffused from the gas permeable sample vessel with a chemical sensor; and recording the progress of the chemical process using the information obtained about the sensed diffused gases.

In accordance with another embodiment of the invention there is provided a microwave system for controlling a microwave heated chemical process comprising: a sample vessel which is permeable to at least one of the gaseous products or byproducts of the chemical process; a sensor for sensing chemical information about the gaseous products or byproducts of the chemical process which have escaped from the sample vessel through diffusion and for providing a signal based on the sensed chemical information pertaining to the diffused products or byproducts; a processor for receiving the signal based on the sensed chemical information pertaining to the diffused products or byproducts, for analyzing the sensed chemical information pertaining to the diffused products or byproducts, and for providing an other signal based on the analysis of the sensed chemical information pertaining to the diffused products or byproducts; and a controller which is responsive to the other signal based on the analysis of the sensed chemical information pertaining to the diffused products or byproducts, for modifying an aspect of the process.

In accordance with another embodiment of the invention there is provided a method of controlling a microwave heated chemical process. The method comprises the steps of: sensing a chemical substance within gases in one of the microwave chamber and the microwave exhaust system to provide sensed chemical information; analyzing the sensed chemical information to determine a change; in response to a change in the sensed chemical information, performing one of reducing microwave radiation energy by an amount less than the current microwave radiation energy level and increasing microwave radiation energy.

In accordance with another embodiment of the invention there is provided a method of controlling a microwave heated chemical process. The method comprises the steps of: applying microwave radiation at a microwave radiation energy level to a sample contained within a vessel; sensing a chemical substance escaping from the vessel to provide sensed chemical information; analyzing the sensed chemical information for a change; in response to a change in the sensed chemical information altering an external stimulus to the system while maintaining application of some microwave radiation to the sample.

In accordance with another embodiment of the invention there is provided a method of controlling a microwave heated chemical process. The method comprises the steps of: sensing a chemical substance within gases in one of the microwave chamber and the microwave exhaust system to provide sensed chemical information; analyzing the sensed chemical information to determine a change; and in response to a change in the sensed chemical information, without terminating the process, altering an aspect of the process.

According to another aspect of the invention, there is provided a microwave system for controlling a microwave heated chemical process comprising: a sensor for sensing a chemical substance within gases in one of the microwave chamber and the microwave exhaust system to provide sensed chemical information; a processor for analyzing the sensed chemical information to determine a change in the chemical process that could result in the change and for providing a first signal in dependence upon the change; and, a controller responsive to the first signal for altering an aspect of the process without terminating the process.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
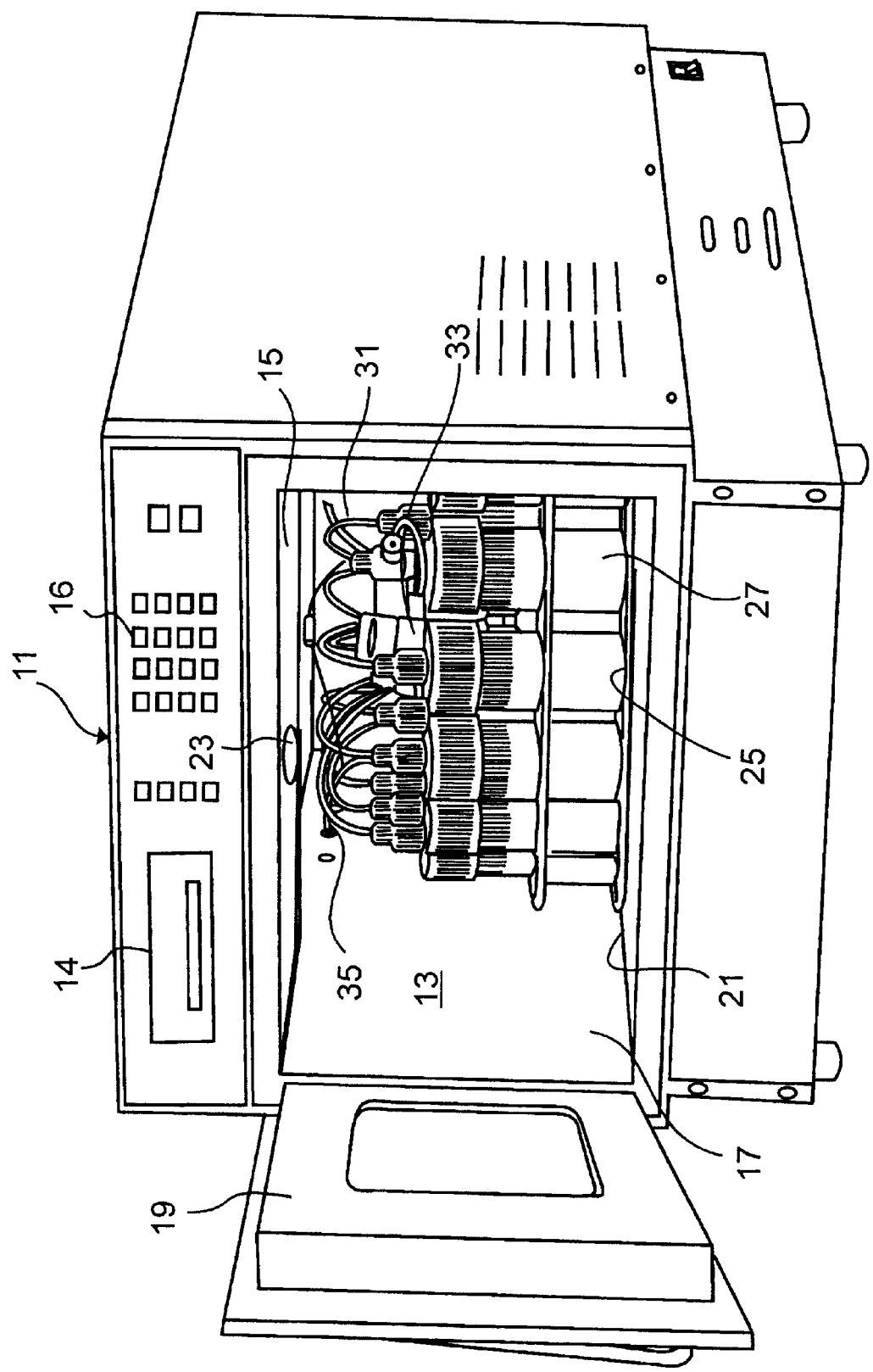
FIG. 1 is a drawing of a microwave oven having an open door and sample vessels within as known in the prior art.

Referring to FIG. 1 a prior art microwave chamber is shown containing a plurality of vessels and a collection chamber. The microwave extraction apparatus or system 11 comprises a chamber 13 which includes a ceiling 15, three side walls 17, a door 19 and a floor 21, with the ceiling having mounted therein a light or lamp 23. A source of microwave radiation, such as a magnetron (not illustrated) directs microwave radiation into the chamber. In the chamber is mounted a turntable 25 on which are positioned a plurality of extraction containers 27.

In FIG. 1, a view of extraction vessels on the turntable in a microwave chamber is shown. The extraction vessels are connected to a collection container wherein any discharges from the extraction vessels, including solvent vapor and entrained liquid, are collected. The collection container head space is connected to solvent detecting and magnetron controlling means external the microwave chamber. This connection allows solvent vapor within the collection container head space to pass from the collection chamber to the solvent detecting means. Extraction containers 27, all of which include rupture diaphragms, each connect to tubes 31, which carry discharged vapor and any entrained material from containers whose rupture diaphragms have burst due to the containers having reached their pre-set maximum design pressure to collection container 33. The headspace in container 33 is connected by another tube 35 to an exhaust duct that contains a vapor detector. In operation such a device monitors vapor concentration to shut down the magnetron in case of sufficient solvent vapor drawn from the collection container through the tube 35 into the exhaust, possibly because of a vapor surge.

It is well known to have chronologically controlled microwave devices. A process involving several process stages each requiring a predetermined microwave radiation energy level and each requiring a predetermined length of time is entered as a plurality of chronological stages. For each stage a time and energy level/temperature are entered. When the process is begun, each stage, except a first stage, is executed following a previous stage. Thus, a plurality of stages is preprogrammed and the process stages are performed one after another. From a scientific perspective, chronological control is optimal since it enhances repeatability and consistency of results. Unfortunately, when using such a programmed process, it is difficult to effect changes to the process in dependence upon information gathered during processing. According to the invention, a method of utilizing chemical data gathered during process execution to modify process parameters and thereby, increase microwave apparatus flexibility is disclosed.

Figure 2:
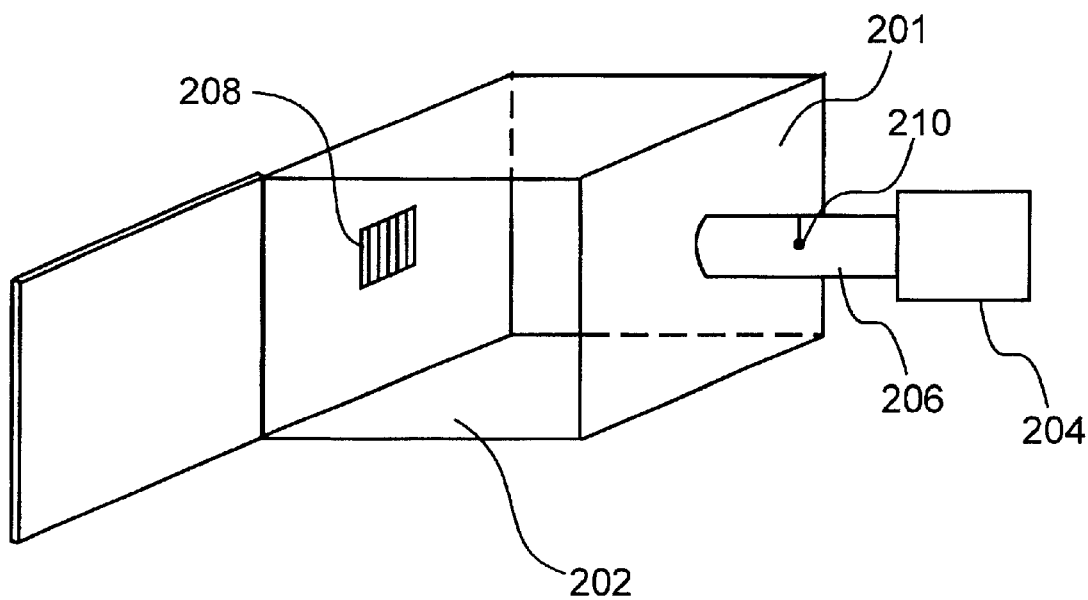
FIG. 2 is a drawing of a microwave oven having an open door.

Referring to FIG. 2, a microwave oven is shown. The microwave oven 201 comprises chamber 202, fan 204, exhaust in the form of an outlet tube 206, and a microwave radiation generator in the form of a magnetron 208. Within the outlet tube 206 is disposed a sensor 210 for sensing chemical content of exhaust gases. The fan 204 draws the exhaust gases from the microwave chamber 202. An output signal from the sensor 210 comprises chemical information in the form of chemical concentration information for analysis to determine progress of a current microwave heated chemical process. This determination is then used to adjust aspects of system control.

Figure 2A:
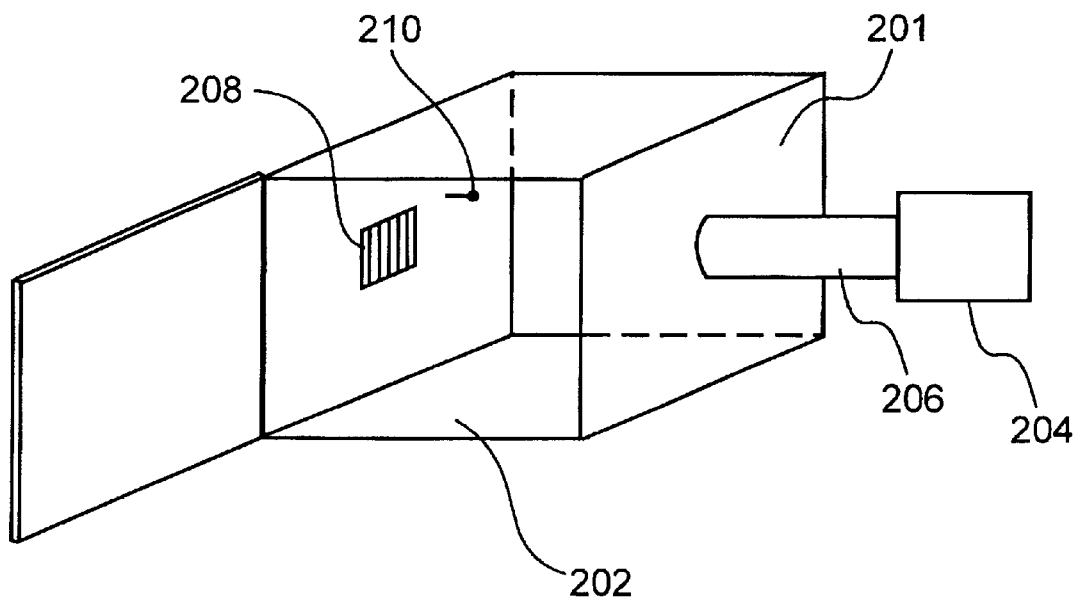
FIG. 2a is a drawing of a microwave oven having an open door and a chemical sensor within the chamber.

Referring to FIG. 2a, a microwave oven is shown. The microwave oven 201 comprises chamber 202, fan 204, exhaust in the form of an outlet tube 206, and a microwave radiation generator in the form of a magnetron 208. Within the chamber 202 is disposed a sensor 210 for sensing chemical content of exhaust gases. The fan 204 draws the exhaust gases from the microwave chamber 202. An output signal from the sensor 210 comprises chemical information in the form of chemical concentrations for analysis to determine progress of a current microwave heated chemical process. This determination is then used to adjust aspects of system control. Of Course, many other configurations are employable with a method according to the invention.

Figure 3:
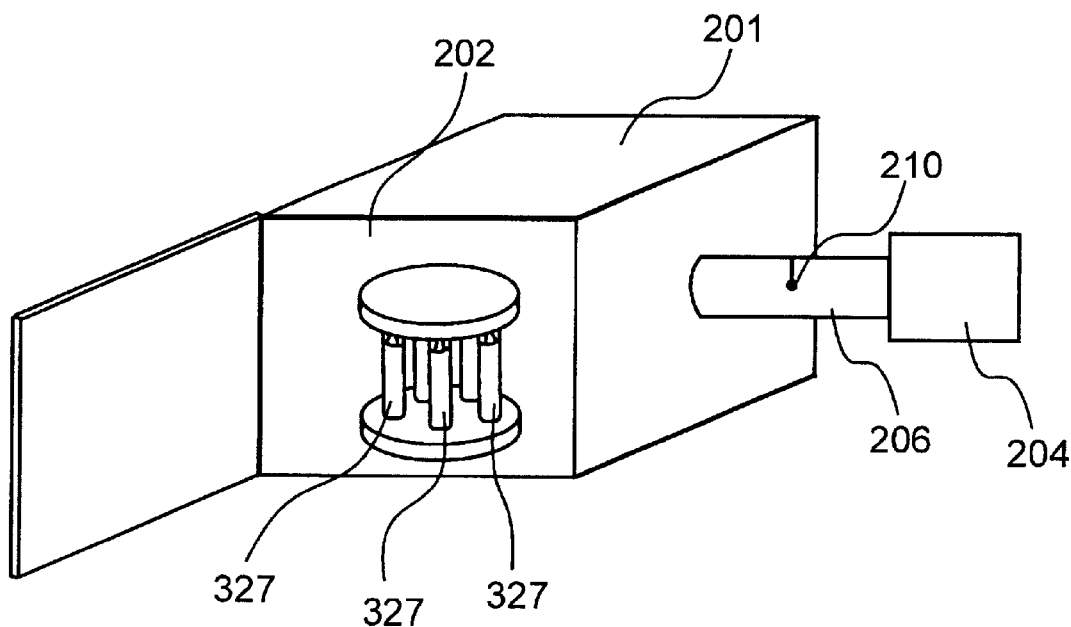
FIG. 3 is a drawing of a microwave chamber containing a vessel having a resealable venting vessel cover.

Referring to FIG. 3, a microwave chamber 202 containing a vessel 327 having a resealable venting vessel cover is shown. It has been found that vessel covers as described in U.S. Pat. No. 5,368,820 hereby incorporated herein by reference, often seat during the first few minutes of an extraction process. Sometimes, when the microwave heating begins, vessel covers are not completely seated on a mating vessel surface. With application of heat and resulting pressure, these vessel covers each move a small amount, thereby adjusting their placement to a correctly seated placement. During this stage, minute quantities of reaction gas are known to escape from such vessels. This quantity of gas, when it escapes, is detected by the sensor 210 and a signal from the sensor dependent upon detected chemical concentrations is analyzed.

In a typical application of the present invention, a microwave heating apparatus is provided with a ventilation system drawing air through the microwave chamber and out an exhaust. The sensor 210 measures gas concentrations within this moving stream of air. Therefore, in such an embodiment, variations in gas concentrations and gas concentrations over known periods of time are monitored. When a concentration of predetermined chemicals detected by the sensor 210 within the gas is reduced over that previously detected, the process is adjusted as appropriate for seated vessel covers. For example, microwave heat energy is modified, ventilation rate is adjusted, stirring is initiated, stirring is terminated, stirring rate is adjusted, or so forth. When the process for seated and unseated vessel covers is identical, no adjustment is performed.

Alternatively, a microwave energy level is increased in order to begin a process in earnest only after vessel cover seating has occurred. Alternatively, a microwave radiation energy level is decreased once seating has occurred to allow a process to proceed more slowly. Further alternatively, the process is modified when chemical concentrations indicative of an improperly seated vessel cover are detected. Thus, depending on a chemical process and in accordance with known chemical principles, the microwave radiation energy level and/or another aspect of a chemical process is adjusted in dependence upon chemical sensor feedback. When using a vessel cover constructed of a material that softens with application of heat, it has been found that seating is improved significantly once the material is softened—heated. For such covers when an unseated vessel cover is detected, microwave radiation energy is reduced to allow heat from the previously applied power to warm the vessel cover and thereby better seat the cover. Once the cover is seated, the process proceeds as programmed. Of course, for different vessel covers and different chemical processes, different corrective actions may be applied.

Referring again to FIG. 3, it is known that some gases diffuse through vessel walls or vessel components during a microwave heated chemical extraction, digestion or hydrolysis process. This phenomenon is significant under predetermined conditions of, for example, process temperature, pressure or time. A sensor 210 detects concentrations of chemicals within gases passing by the sensor. Since some chemical species are more likely to diffuse than others, a time resolved signal from the chemical sensor 210 indicates whether the detected chemicals within the gas likely result from diffusion or from another source such as an unseated vessel cover. When diffusion is determined to be a cause of sensed chemical concentrations within the outlet tube 206, microwave radiation energy levels are adjusted to maintain diffusion in a desired range. Alternatively, microwave radiation energy levels are adjusted to return detected diffusion to a predetermined range. The range is determined based on the chemical process performed. Of course, similar process control is achieved when the chemical sensor 210 is within the microwave chamber 202 as shown in FIG. 2a. For clarity, since some chemical species are more likely to diffuse than others, a presence of higher than normal concentrations of those chemicals indicates that diffusion is likely occurring. By determining, in advance, information relating to diffusion rates of different chemicals, diffusion signatures are achieved and it is sometimes possible to distinguish between chemical concentrations resulting from diffusion and chemical concentrations within a same quantity of gas that result from other causes.

Figure 4:
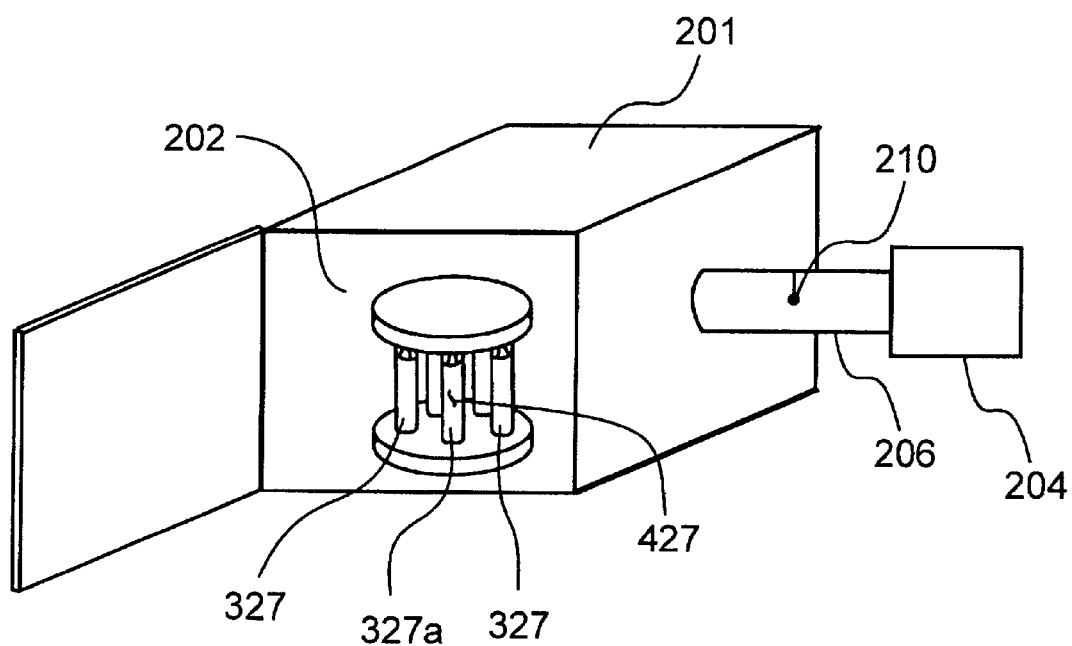
FIG. 4 is a drawing of a cracked vessel with a sealed vessel cover within a microwave chamber.

Referring to FIG. 4, a cracked vessel 327a with a sealed vessel cover is shown in a microwave chamber. The crack 427 is in the form of a minute fissure in the side wall of the vessel. When the vessel cracks, an amount of gas escapes through the crack. This gas is drawn through the outlet tube 206 past the sensor 210 where it is detected. An amount of gas detected indicates a size of an opening in a vessel. When the opening is small, it appears similar to venting of a vessel cover during venting; however, unless the fissure is resealable, the venting of gases through the fissure continues over a lengthy period of time. For example, when a vessel undergoes catastrophic failure, the gases within the vessel are drawn through the outlet tube and the sensor detects chemical concentrations within the gases. It may be that sufficient explosive chemicals exist to necessitate a system shut down as taught by Revesz. Alternatively, fanning is increased substantially in order to diffuse the gases more quickly. Starting fans 204b near the outlet port of the outlet tube 206 increases fanning. The additional fans disperse the gas quickly and effectively. Alternatively, the fan 204 is turned at a faster rate to increase airflow through the microwave chamber and thereby vent the gases more quickly. Alternatively, inert gases are caused to flow into the microwave chamber in order to displace oxygen from the chamber and thereby suppress the potential for ignition or explosion of explosive gases. Of course, other means of venting the microwave chamber more quickly are also available.

When a resealable venting vessel cover exhausts gas, the gas is drawn past the sensor 210. The gas is detected and the chemical process is adapted in response to the sensed chemical concentrations. For example, venting of the microwave chamber is increased while microwave radiation energy is reduced to prevent further venting of sample vessels. Of course other adjustments are possible and these are determined in dependence upon chemical processes occurring in each vessel. By analyzing the time resolved change in chemical concentrations within gases detected, it is possible to distinguish between venting of a vessel, chemical diffusion through the vessel wall, or incomplete vessel cover seating. This allows for detection and/or monitoring of three separate phenomena simultaneously and for controlling an ongoing process somewhat independently for each of the three phenomena detected. In order to determine chemical concentration signatures for each of said phenomena, experimentation with the phenomena is performed for a predetermined chemical process and results are used for analysis of chemical concentrations detected when performing same or similar chemical processes. The sensor comprises one of a single sensor for detecting a single chemical substance, a plurality of sensors for detecting a plurality of chemical substances, or a single sensor for detecting a plurality of chemical substances.

Figure 5:
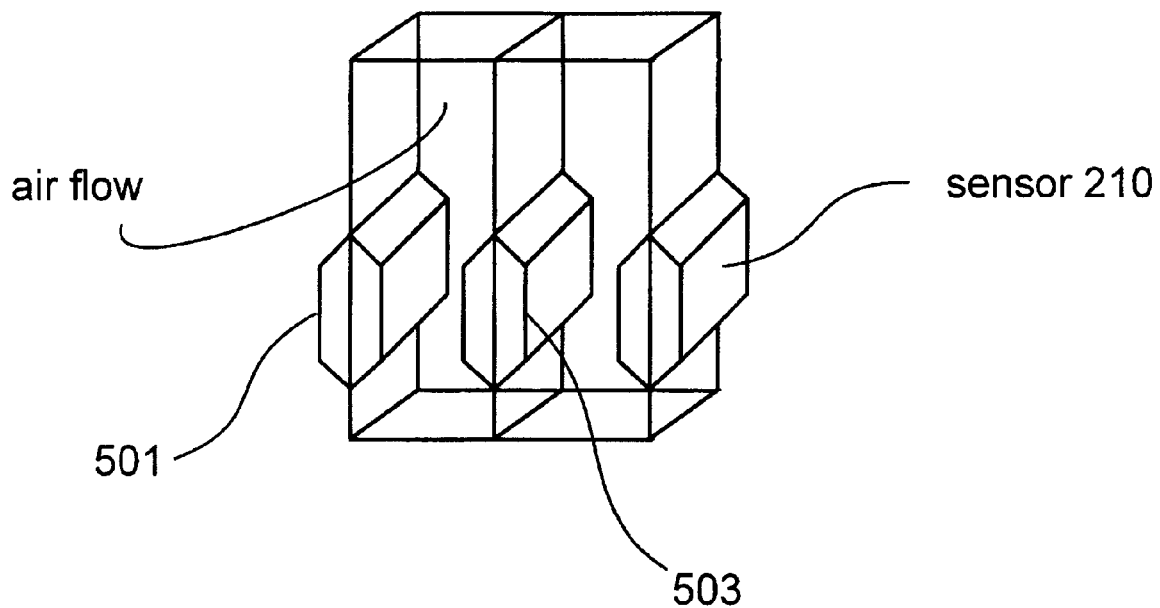
FIG. 5 is a simplified diagram of a sensor comprising a plurality of integrated circuits for sensing each of a plurality of different chemicals.

Referring to FIG. 5, a sensor is shown. The sensor is in the form of a plurality of integrated circuits each for detecting a different chemical and/or a different chemical concentration. Sensor 501 is an NOx sensor for detecting NOx within the exhaust fumes. Sensors for detecting NOx are known in the art of chemical sensor design and are available—for example, sensor type NAP-11AN, from MLS GmbH, Mikrowellen—Labor—Systeme, Leutkirch, Germany. Sensor 503 is a sensor for a group of organic molecules that are potentially explosive. Other sensors detect other chemicals such as hydrofluoric acid, etc. Each sensor provides a signal based on a composition of a gas in which the sensor is placed. The sensor shown in FIG. 5 is assembled in a fashion such that air drawn through the outlet tube 206 passes around each integrated circuit. Signals from each integrated circuit are provided to an analysis circuit.

Figure 5A:
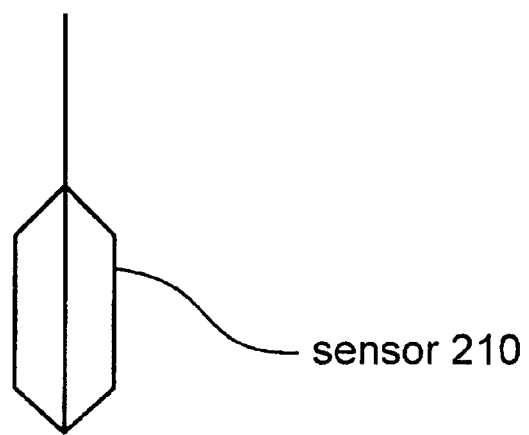
FIG. 5a is a simplified diagram of another embodiment of a sensor wherein two integrated circuits are mounted on opposing sides of a probe.

Referring to FIG. 5a, another embodiment of a sensor is shown wherein two integrated circuits are mounted on opposing sides of a probe. Of course, when a sensor is disposed on a wall of the outlet tube 206 or of the microwave chamber 202, a probe is not necessary.

Figure 6:
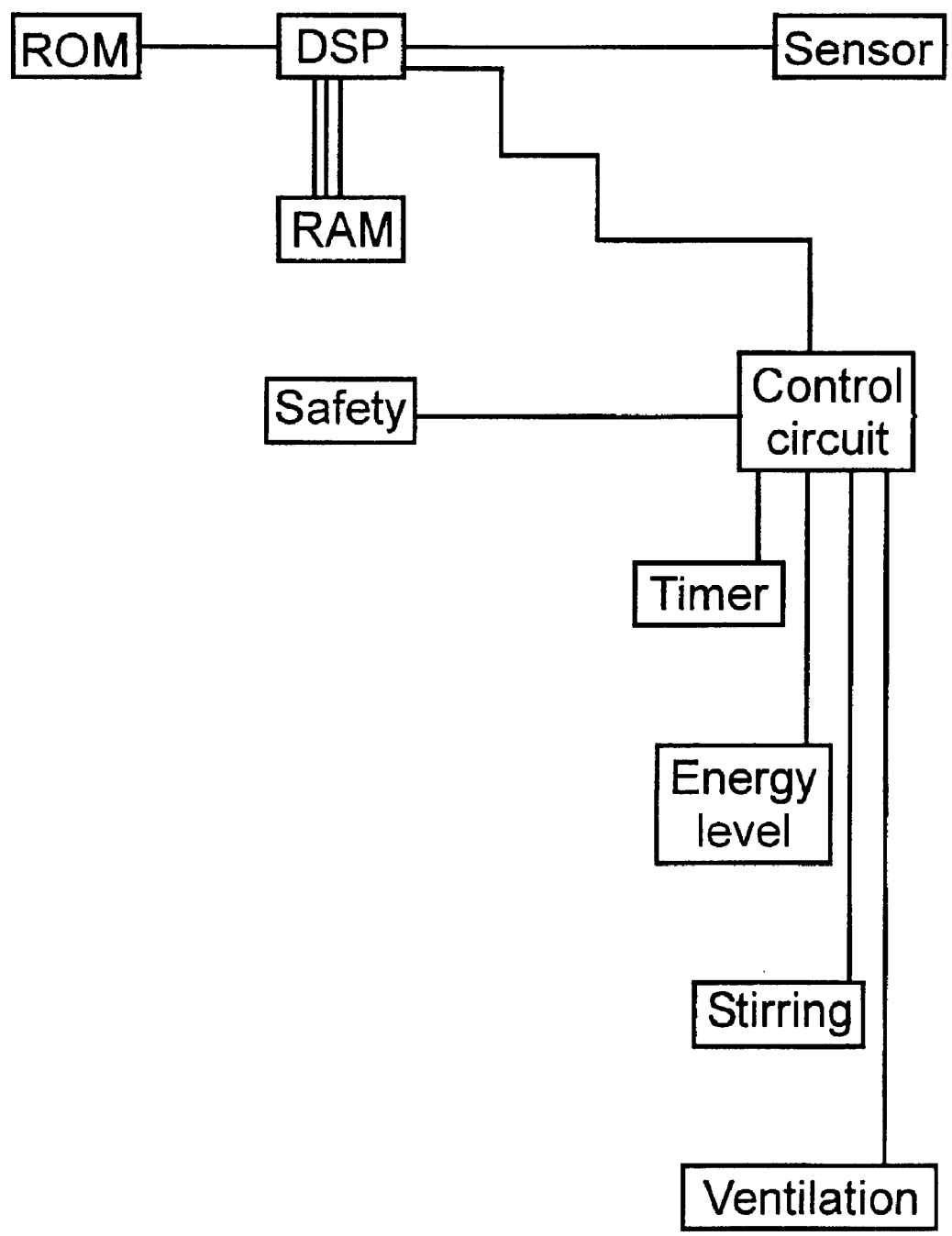
FIG. 6 is a simplified block diagram of an analysis circuit.

Referring to FIG. 6, a block diagram of an analysis circuit is shown. The analysis circuit comprises a processor in the form of a digital signal processor (DSP) for receiving signals from the sensors 210 and for determining a concentration of some chemical substances proximate to the sensors 210. The concentration of predetermined gases and other information are used to determine process adjustments to maintain safety and where possible viability of a current chemical process. Only in extreme circumstances is the entire system shut down.

Figure 7:
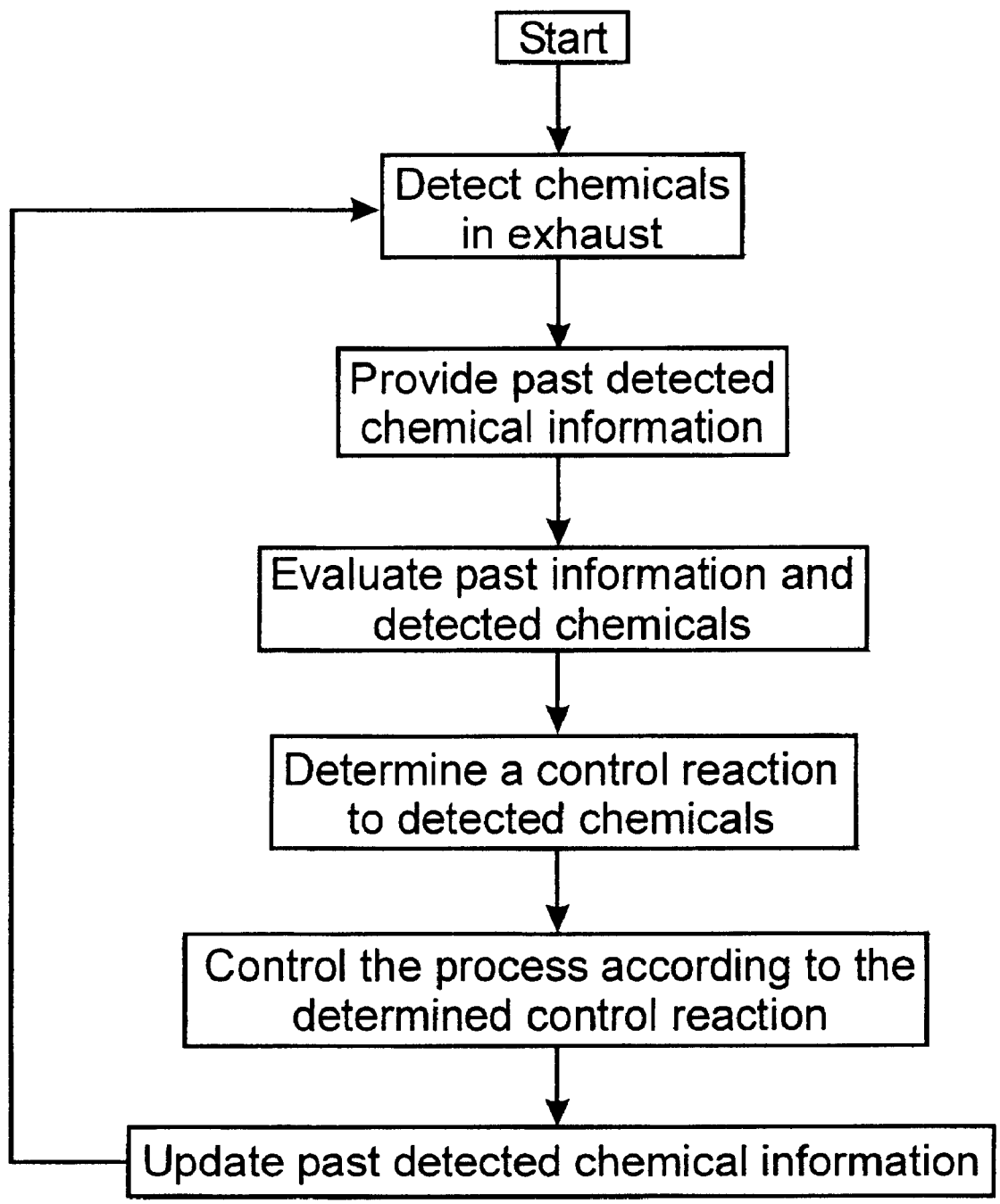
FIG. 7 is a simplified flow diagram of a method according to the invention.

Referring to FIG. 7, a flow diagram of a method according to the invention is shown. Chemical concentrations are detected using a sensor within the microwave chamber 202 or within the microwave exhaust 206. The detected chemical information is provided to a processor in the form of a DSP. The information is analyzed along with past detected chemical information, past control responses, and stored data in the form of anticipated outcomes of past control responses. Based on the analysis, a control response is determined and the chemical process is controlled based on the determined control response. Specific control responses are outlined above and below. Of course, a combination of control responses is employed when determined beneficial. In an embodiment employing a combination of control responses, one of a neural network and an expert system is used to determine optimal control responses for detected chemical concentrations. The design and implementation of such a control system is well known in the art of computer science and more particularly in those areas of computer science focused on design and implementation of the above mentioned systems.

In an embodiment, stirring speed is modified according to the determined control response. When stirring is used to assist a process, the stirring is commenced once the process has progressed sufficiently to ensure that vessel covers are well seated. Alternatively, stirring speeds are increased or decreased in accordance with detected chemical concentrations. Depending on a chemical process within a sample vessel, gases formed within the vessel and therefore emitted by diffusion, venting, unseated caps, etc. are reduced or increased through application of increased stirring. Sometimes, gas production is unaffected by stirring. When gas emissions are affected by stirring, controlling stirring allows for an increase or reduction in gas within sample vessels during a process. For example when stirring increases gas formation, it is not desirable to stir until vessel covers are well seated. Therefore, a stirring mechanism is disabled or very slight stirring occurs until vessel cover seating is determined to be acceptable.

In an embodiment, chemical concentrations are analyzed to determine chemical profiles for assessing causes of predetermined portions of chemical concentrations detected within the gas. For example, when a first chemical diffuses more than a second, a profile of the diffusion ratio allows a predetermined algorithm to process chemical concentrations and determine what portion results from venting of vessel covers and what portion results from diffusion. These results form a chemical profile in the form of chemical information, concentration information, and sources of each concentration or of portions of the concentrations. Of course, chemical profiles may incorporate other data for determining control responses.

According to another embodiment, microwave radiation energy is modified according to the determined control response. For example, when a profile of detected chemicals is similar to a chemical profile indicative of an unseated vessel cover, the power provided to the magnetron is reduced and, therefore, the microwave radiation energy level is reduced. Subsequently, when the profile of detected chemicals is similar to a chemical profile indicative of well seated vessel covers, the power level is returned to a normal level.

According to another embodiment, process time or times for different aspects of a process are modified in order to control said process. The times are, for example, extended when insufficient diffusion occurs or are foreshortened when excessive vessel venting occurs. Preferably, process time modification and microwave radiation energy modification are used together to effect controlled processes achieving substantially similar results to those desired by an operator. In a common digestion process, a sample within a vessel is heated to a predetermined temperature and maintained about that temperature for a predetermined period of time. Using a method according to the invention, the heating of the sample is effected in a more controlled manner until it reaches the predetermined temperature. Effects of diffusion and unseated vessel covers are minimized when that is desirable. The process control functions do not effect the repeatability or effectiveness of the overall process. Though the term chemical concentration is used throughout this disclosure, a more suitable phrase is time resolved concentration or the change in concentration as a function of time.

It is apparent to those of skill in the art that time resolved concentration is determined by comparing a detected concentration to a previously detected concentration. For example, an ill fitted vessel cover results in a rising concentration with slope dependent on the applied power and reactions going on inside the vessel; the ill fitted vessel cover is usually only of concern early on in a process. Diffusion through vessel walls or vessel components results in a low and slowly rising concentration. Venting results in a detected chemical concentration spike that is narrow in time; the concentration rises rapidly when venting occurs and falls off rapidly since the vessel cover reseals. A cracked, broken or exploded vessel likely results in a large detected concentration spike that settles down to a new, higher baseline that decreases over time as the process progresses and exhausting of fumes within the microwave chamber continues. Molecules of the form NOx are easily detected. This is desirable because of the corrosiveness of the nitric acid used in aggressive sample digestions and the potential for damage to equipment and injury to personnel. Some chemicals are monitored because they are carcinogenic; some chemicals are extremely toxic even to the point of being lethal such as hydrofluoric acid and its fumes. Typical digestion acids are hydrochloric acid, nitric acid, hydrofluoric acid, phosphoric acid, hydrogen peroxide, sulfuric acid and perchloric acid. Toxicity, hazardous exposure, corrosiveness to equipment, and potentially lethal exposure are all important issues in controlling a process and, according to the invention, are monitored and prevented when possible; however, for control of a process, it is important to continue the process in the form of digestion, extraction, and/or hydrolysis to its conclusion when feasible.

Figure 8:
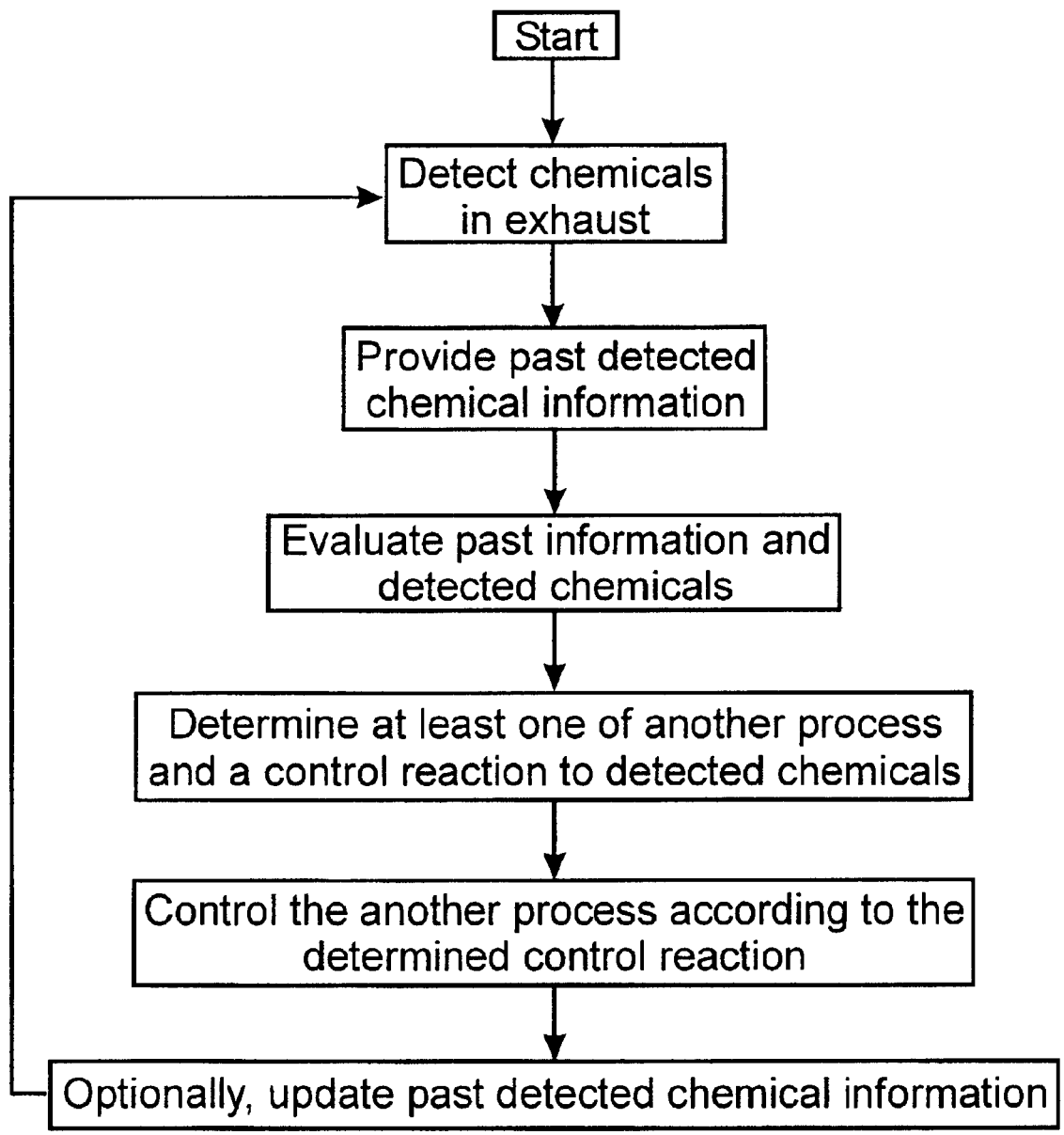
FIG. 8 is a simplified flow diagram of another method according to the invention wherein a second other process is controlled based on chemical concentrations detected.
Figure 9:
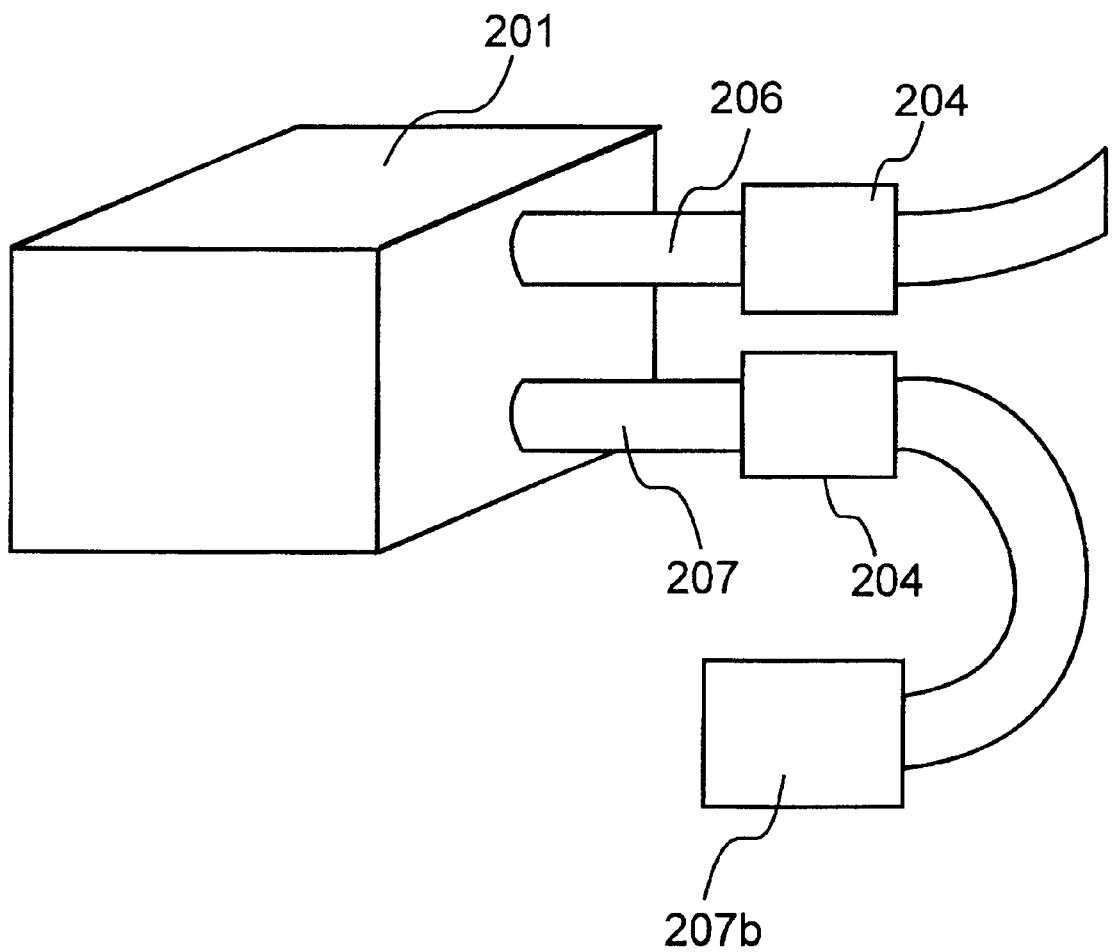
FIG. 9 is a simplified diagram of a microwave oven having two separate exhaust systems.

In an embodiment shown in FIG. 8, instead of affecting process control, the sensor signal is used to affect another process—for example to enhance process safety. This is achieved by providing safety processes for initiation upon detection of predetermined chemical concentrations. For example, should a vessel catastrophically fail —explode— the contents are dispersed within the microwave chamber. When the contents are hazardous in the form of toxic chemicals or explosive chemicals, upon detection of a high concentration of the chemicals, neutralizing chemicals or inert gases are provided at an inlet to the microwave chamber in order to dilute and/or neutralize the hazardous chemicals. Since such neutralizing process or agent is sometimes very costly, it is advantageous to employ same only when a hazard occurs. Another safety process according to the invention involves a second other exhaust for providing chemical neutralization as shown in FIG. 9. When detected hazardous chemical concentrations exceed predetermined thresholds, the first exhaust 206 is substantially sealed and the gas including the hazardous chemicals is directed through the second other exhaust 207 to a system 207b for neutralization or appropriate storage. This effectively, improves safety in processing of hazardous chemicals.

Alternatively, instead of a single sensor within a microwave apparatus, a plurality of sensors are used to detect gas concentration information.

The detected concentrations are analyzed to produce gas flow related information for adjusting a process, venting, safety processes, stirring, etc. according to the invention. The use of a plurality of chemical sensors allows for more accurate estimation of chemical sources and causes of chemical emissions. Also, the use of a plurality of sensors within the microwave chamber and within the exhaust enhances control options and fault tolerance.

In a further embodiment, the method of controlling a process disclosed herein is used during microwave radiation heated evaporation. The evaporation is performed, for example, in a device such as that disclosed in U.S. Pat. No. 5,447,077. A chemical sensor disposed so as to detect chemical concentrations of evaporated gases is used to monitor an ongoing evaporation process. For example, chemicals, which evaporate above but very near the desired evaporation process temperature, are monitored and when an increase in concentration is detected, the process temperature is reduced to prevent loss of those chemicals. Of course, monitoring of an evaporation process is also useful for implementing safety processes, preventing catastrophic failures, recording data regarding process progression and execution, and for controlling the evaporation process in numerous other ways. As is evident to those of skill in the art, monitoring of an evaporation process is possible when a sensor is disposed within a flow of evaporated gases. For example, a sensor disposed at an outlet to a sample vessel or at an evaporation exhaust to an evaporator apparatus detects chemical concentrations within exhausted gases. Of course, chemical sensors disposed outside of the evaporation apparatus allow for detection of leaks in the evaporation apparatus, diffusion, catastrophic failure, etc.

According to another embodiment, data relating to gases diffused from some component of the sample vessel is used to control a microwave heated chemical process. The sample vessel is manufactured, at least in part, from a gas permeable substance such as an appropriate plastic or ceramic material, which is permeable to at least one of the gases produced in the microwave heated chemical process, yet still contains the other contents of the sample vessel. A typical procedure involves placing the sample vessel containing the starting materials into the microwave oven and starting the heating process. As the process continues the vapors in the sample vessel diffuse through some component of the sample vessel and are detected with a chemical sensor located within the microwave chamber or within an exhaust portion of the system. The vapors or gases diffused through some component of the sample vessel can originate from one of the starting materials or from a product or byproduct of the process. The chemical sensor detects the concentration and/or composition of the diffused gas and provides a signal to a processor based on the sensed information. The processor then analyzes the sensed information to determine whether an aspect of the system should be modified, and accordingly sends another signal to a controller that consequently modifies the desired aspect of the system. The controller can control the microwave energy source, a stirring system, an exhaust system, or a means for introducing additional chemical substances into the sample vessel. Consider for example, a process in which it is desirable to maintain the concentration of a diffused chemical substance 'c' at a certain level for a specific period of time, and that the concentration of 'c' diffused from the vessel can be increased by increasing the amount of applied microwave radiation. If during this process the chemical sensor indicates that the concentration of 'c' diffused through some component of the sample vessel is less than desired, then the amount of applied microwave energy is increased. Similarly, if the chemical sensor indicates that the concentration of 'c' diffused through some component of the sample vessel is higher than desired, then the amount of applied microwave energy is decreased. The procedure of increasing or decreasing the amount of applied microwave radiation is continued throughout the specified time period to maintain the concentration of 'c' within an acceptable range. Alternatively, the process time is modified while the concentration of substance 'c' is maintained at a certain level. In another example, it is necessary to maintain the concentration of substance 'c' below a specific level for safety reasons. When the concentration of 'c' is determined to be higher than the specific level then the amount of microwave radiation is reduced, or if the concentration of 'c' is dangerously high, safety measures are taken, such as introducing a neutralizing substance into the microwave chamber or increasing ventilation within the chamber. In another example data related to the diffused gases is correlated against known data, acquired with a standard, to determine whether the change in concentration of a diffused substance arises from diffusion alone or from a combination of diffusion and at least one of an improperly seated vessel cover, a venting of the vessel due to excessive pressure, and a broken or cracked vessel i.e. a defective vessel.

In another embodiment, data related to gases diffused from some component of the sample vessel is used to monitor and record the progress of the process. As the microwave heated process proceeds the gases diffuse through some component of the sample vessel and are detected with the chemical sensor. The chemical sensor detects the concentration and/or composition of the gas and provides a signal to a processor based on this information, which in turn stores and/or records the data. During the process of the experiment an abundance of data is collected, stored, and recorded. Resulting plots of concentration versus process time for each detected chemical substance provide exceptional insight into the process. In particular the graphical data is used to track a specific product or by-product of the process, to monitor the concentration of initial starting materials, to determine the identity of products or byproducts of the process, to determine the concentration of the products or byproducts of the process, to determine a rate of reaction, or to simply provide a record of the process for comparison with previous or future experiments. For example, in a typical process it is desirable to know whether the contents of the sample vessel has been decreased substantially due to excessive venting of the sample vessel. A plot of concentration versus time for the duration of the process indicates any rapid increases in concentration, clearly showing the number of times the vessel has vented during the process. In another example the concentration of the diffused substances is plotted with respect to time as the process proceeds. For a known process this plot can be used to indicate what stage of the process the experiment is in, thus providing the experimenter with valuable time management opportunities and greater control of the process.

In another embodiment of the present invention the temperature and pressure of the process is measured and recorded in addition to the information obtained with the chemical sensor. Typically temperature and pressure can be used to monitor a microwave heated chemical process, however, for a process that produces a gaseous product or by-product 'd' the relationship between temperature and pressure is no longer cooperatively related, but is also dependent on the amount of gas 'd' produced. In such cases it is also necessary to measure the concentration of the gaseous products or byproducts. Another advantage of this embodiment of the invention is that using a chemical sensor to follow a chemical process is specific. For example, there are many processes that can be followed by recording the variation in pressure, however this method is non-specific, that is all of the gas phase molecules contribute to the pressure. A similar method using a chemical sensor is specific to each diffused substance, and hence can provide more detailed information.

In another embodiment, monitoring the progress of the process may involve maintaining the efficiency of the process. For example, in order to maintain an active digestion system when digesting materials the concentration of digestion acid(s) must be sufficiently high. Since the amount of acid in solution is related to the amount of acid in the vapor phase above the solution, which is in turn related to the amount of acid that diffuses from the vessel, a decrease in the amount of acid fumes diffusing from the vessel can indicate a decrease in efficiency of the process. When a decrease in concentration of acid diffusing from the vessel is detected the process can be halted in order to alter an aspect of the process accordingly. Alternatively, the products or byproducts of a chemical process can be monitored to maintain the efficiency of the process. For example, if a high concentration of a specific diffused chemical substance indicates an efficient process, then an aspect of the process can be modified to increase the concentration of this specific diffused chemical substance. Furthermore, the efficiency of the process can be adjusted when there are competing processes. For example, if there are two processes occurring simultaneously within the sample vessel, both of which use chemical substance 'e', then it is advantageous to limit the undesired process to conserve the amount of chemical substance 'e' for the desired process. The undesired process is quenched by altering an aspect of the process, which is controlled based on information about diffused chemicals associated with the undesired process.

In another embodiment data related to gases diffused from some component of the sample vessel is used to indicate the purity of a chemical substance used in the process. Consider, for example, a typical microwave distillation. In this instance the sample vessel containing the mixture, the distillation column and all connections thereon, are composed of a non-porous material, such as glass, and the receiving vessel for containing the distillate is composed, at least in part, of a material which is permeable to the vapors of the distillate and the contaminants, yet still contains the corresponding liquid phases. The gases diffused from the permeable receiving vessel emanate from the distillate and any contaminants, and thus the identity and/or concentration of the contaminants can be determined. Alternatively, a chemical sensor is placed in the path of the distilled substance before condensation, or in the path of an exhaust system connected to the receiving vessel, to determine the purity and/or composition of the distillate.

In another embodiment data related to gases diffused from some component of the sample vessel is used to indicate the presence of unwanted gases or volatile substances within the microwave chamber, and hence provide an inspection of the chamber contents prior to opening the microwave door or the covered sample vessels, thus protecting the individual opening the microwave door or the covered sample vessels. and allowing a procedure for containing the unwanted substance to be adopted. This is of particular importance when an aggressive solvent, a toxic substance, an environmentally unfriendly substance, or a particularly odorous substance is detected with the chemical sensor. Typically at the end of a microwave heated procedure it is common practice to open the microwave oven door to remove the samples, however, if an unwanted substance is present within the chamber or sample vessels then the individual opening the same will be unnecessarily exposed. A chemical sensor within the microwave chamber can sense the presence of unwanted substances within the sample vessel, and can consequently provide a signal indicating when it is safe to open the microwave chamber. Depending on the process and the identity of the unwanted substance the sample vessels and microwave chamber can be vented, contained, or extracted, accordingly. An advantage of this embodiment of the present invention is that individuals using the microwave do not have to be exposed to toxic substances, to substances that can corrode or stain, or to chemical stench. For example, many chemical substances smell bad at very low concentrations and consequentially, the presence of even the smallest amounts can accost an individual caught unaware.

As described above, and in accordance with the invention, a method of controlling a microwave heated chemical process is disclosed which provides improved laboratory work conditions, higher productivity, greater reproducibility, higher sensitivity, improved quality of process and greater flexibility.

Numerous other embodiments are envisaged without departing from the spirit or scope of the invention.

What is claimed is:

1. A method of controlling a microwave heated chemical process comprising the steps of:
    irradiating a sample vessel with microwave radiation, the sample vessel comprising at least a vessel component that is normally permeable to one or more gases produced within the sample vessel during the microwave heated chemical process;
    monitoring the one or more gases diffused through the at least a vessel component with a chemical sensor to obtain chemical information about the diffused one or more gases;
    repetitively analyzing the chemical information received from the chemical sensor to determine data indicative of the diffused one or more gases; and
    modifying an aspect of the chemical process in response to the determined data indicative of the diffused one or more gases.

2. A method of controlling a microwave heated chemical process as defined in claim 1 wherein monitoring the gases diffused from the at least a component of the gas permeable sample vessel and analyzing the chemical information received from the chemical sensor to determine data indicative of the diffused gases comprises:
    sensing a diffused chemical substance and providing a signal based on a concentration of the diffused chemical substance at a first time;
    sensing the diffused chemical substance and providing a signal based on a concentration at a second other time; and
    comparing the signal based on the diffused chemical substance at the first time and the signal based on the diffused chemical substance at the second other time to determine a change in concentration of the diffused chemical substance with time.

3. A method of controlling a microwave heated chemical process as defined in claim 2 wherein monitoring the gases diffused from the at least a component of the gas permeable sample vessel further includes identifying the sensed chemical substance.

4. A method of controlling a microwave heated chemical process as defined in claim 3 wherein the determined change in concentration and composition of the sensed chemical substance is correlated against known data to determine whether the change in concentration arises from diffusion alone or from a combination of diffusion and at least one of an improperly seated vessel cover, a venting of the vessel due to excessive pressure, and a defective vessel.

5. A method of controlling a microwave heated chemical process as defined in claim 3 wherein modifying an aspect of the chemical process is accomplished by modifying at least an aspect of a system selected from a microwave energy system, an exhaust system, and a stirring system.

6. A method of controlling a microwave heated chemical process as defined in claim 5 wherein modifying an aspect of the microwave energy system comprises one of reducing the microwave radiation energy from the microwave energy source and increasing the microwave radiation energy from the microwave energy source.

7. A method of controlling a microwave heated chemical process as defined in claim 3 wherein modifying an aspect of the chemical process comprises modifying the process time.

8. A method of controlling a microwave heated chemical process as defined in claim 3 wherein the sensor is housed within the exhaust portion of the microwave device.

9. A method of controlling a microwave heated chemical process as defined in claim 3 wherein the sensor is housed within a chamber of the microwave device.

10. A method of controlling a microwave heated chemical process as defined in claim 3 further comprising the step of monitoring at least one of a temperature and a pressure of the chemical process.

11. A method of controlling a microwave heated chemical process as defined in claim 3 wherein the chemical process is selected from one of extraction, hydrolysis, evaporation and digestion of materials.

12. A method of controlling a microwave heated chemical process comprising the steps of:

irradiating a sample vessel with microwave radiation, the sample vessel comprising at least a vessel component that is normally permeable to one or more gases produced within the sample vessel during the microwave heated chemical process;

detecting the one or more gases diffused through the at least a vessel component with a chemical sensor to obtain chemical information about the diffused one or more gases;

repetitively analyzing the chemical information received from the chemical sensor to determine data indicative of the diffused one or more gases; and applying an external stimulus to the chemical process in response to the determined data indicative of the diffused one or more gases.

13. A method of controlling a microwave heated chemical process according to claim 12 wherein the external stimulus to the chemical process is selected from at least one of a system for neutralizing a predetermined detected gas, a system for flooding a microwave chamber with a neutralizing substance, and a chemical storage system.

14. A method of controlling a microwave heated chemical process comprising the steps of:

irradiating a sample vessel with microwave radiation, the sample vessel comprising at least a vessel component that is normally permeable to one or more gases produced within the sample vessel during the microwave heated chemical process;

sensing the one or more gases diffused through the at least a vessel component with a chemical sensor; and recording the progress of the chemical process using the information obtained about the sensed diffused one or more gases.

15. A method of controlling a microwave heated chemical process according to claim 14 wherein the chemical process is selected from one of extraction, hydrolysis, evaporation and digestion of material.

16. A microwave system for controlling a microwave heated chemical process comprising:

a microwave energy source;

a sample vessel in operative communication with the microwave energy source for containing one or more chemical substances in the chemical process, the sample vessel having a component that is normally permeable to at least a gaseous chemical substance in the microwave heated chemical process;

a sensor for sensing chemical information about the at least a gaseous chemical substance which has permeated through the component of the sample vessel by diffusion and for providing a signal based on the sensed chemical information;

a processor for receiving the signal based on the sensed chemical information, for repeatedly analyzing the sensed chemical information, and for providing another signal based on the analysis of the sensed chemical information; and a controller which is responsive to the other signal based on the analysis of the sensed chemical information, for modifying an aspect of the chemical process.

17. A microwave system for controlling a microwave heated chemical process as defined in claim 16 wherein the controller controls at least one of a microwave energy source, an exhaust system, and a stirring system.

18. A microwave system for controlling a microwave heated chemical process as defined in claim 17 wherein the sensor comprises a plurality of chemical sensors for detecting a plurality of chemical substances.

19. A microwave system for controlling a microwave heated chemical process as defined in claim 16 wherein the controller controls at least one of a chemical neutralization system and a chemical storage system.

20. A microwave system for controlling a microwave heated chemical process as defined in claim 16 wherein the processor provides the other signal based on the analysis of the sensed chemical information pertaining to the diffused products or byproducts to a recording device for recording the progress of the process.

* * * * *